United States Patent [19]

Chou et al.

[11] Patent Number: 5,446,913
[45] Date of Patent: Aug. 29, 1995

[54] METHOD AND SYSTEM FOR NONSEQUENTIAL EXECUTION OF INTERMIXED SCALAR AND VECTOR INSTRUCTIONS IN A DATA PROCESSING SYSTEM UTILIZING A FINISH INSTRUCTION ARRAY

[75] Inventors: Norman C. Chou, Poughkeepsie; Edward J. D'Avignon, Kingston; James C. Gregerson, Hyde Park; James R. Robinson, Clinton Corners; Michael S. Siegel, Hyde Park, all of N.Y.; Michael A. Smoolca, Middletown, Conn.; Albert J. Van Norstrand, Jr., Red Hook, N.Y.

[73] Assignee: International Business Machines Corporation

[21] Appl. No.: 991,665

[22] Filed: Dec. 16, 1992

[51] Int. Cl.⁶ .......................... G06F 9/26; G06F 9/30; G06F 9/38
[52] U.S. Cl. .................. 395/800; 364/229.5; 364/232.21; 364/262.4; 364/262.8; 364/262.9; 364/263; 364/263.1; 364/263.2; 364/263.3; 364/DIG. 1; 364/DIG. 2; 395/375
[58] Field of Search ............... 395/800, 375, 500, 400, 395/425, 575; 364/DIG. 1, DIG. 2

[56] References Cited

U.S. PATENT DOCUMENTS

| 4,722,049 | 1/1988 | Lahti | 395/375 |
| 4,803,620 | 2/1989 | Inagami et al. | 395/375 |
| 4,901,233 | 2/1990 | Liptay | 395/375 |

*Primary Examiner*—Alyssa H. Bowler
*Assistant Examiner*—Daniel H. Pan
*Attorney, Agent, or Firm*—Lynn L. Augspurger; Andrew J. Dillon

[57] ABSTRACT

A method and system for enhancing processing efficiency in a data processing system which includes multiple scalar instruction processors and a vector instruction processor. An ordered sequence of intermixed scalar and vector instructions is processed in a nonsequential order by coupling those instructions to selected processors. As each instruction is finished an indication of that state is stored within a finish instruction array. The first vector instruction within the ordered sequence is initiated within the vector instruction processor only after an indication that each scalar instruction preceding the first vector instruction is finished. A vector advance signal is generated by the vector instruction processor each time processing of a vector instruction is initiated. A subsequent vector instruction is then initiated when the vector processor assets are available only in response to the presence of the vector advance signal and an indication that all scalar instructions which proceed the subsequent vector instruction within the ordered sequence have finished, without encountering an exception. In this manner, chained processing of vector instructions may be accomplished by initiating processing of a subsequent vector instruction only after possible interruption by a scalar instruction exception is no longer possible.

6 Claims, 4 Drawing Sheets

METHOD AND SYSTEM FOR NONSEQUENTIAL EXECUTION OF INTERMIXED SCALAR AND VECTOR INSTRUCTIONS IN A DATA PROCESSING SYSTEM UTILIZING A FINISH INSTRUCTION ARRAY

BACKGROUND OF THE INVENTION

1. Technical Field

The present invention relates in general to improved data processing systems and in particular to a method and system for enhanced processing efficiency within a data processing system. Still more particularly, the present invention relates to an improved method and system for nonsequential processing of an ordered sequence of scalar and vector instructions within a data processing system.

2. Description of the Related Art

In known data processing systems instructions are normally processed in a specific order which is specified by the program. Normally, these instructions are both executed and finished sequentially in this program order. To increase performance and limit delays, modern data processing systems have been enhanced to permit the finishing of program instructions in a nonsequential order, so as to overlap with execution instructions. However, execution instructions are generally limited to the sequential order required by the program. A general requirement for such program instruction overlap is that the instructions are completed as though they had been accomplished in the order specified by the program. Program instruction overlap is desirable to increase performance but may involve increased machine complexity and hardware costs. However, it is generally considered beneficial and typically enhances processing efficiency to permit instruction overlap which accomplishes both execution and finishing of program instructions in an out of order sequence.

High level data processing systems typically utilize two types of processing units, namely scalar processing units and vector processing units. Scalar processing units are designed to execute scalar instructions and vector processing units are designed to execute vector instructions. When utilized in conjunction within one data processing system there are generally two processing strategies for processing scalar and vector instructions which are currently proposed.

According to a first processing strategy, a mixed sequence or chain of instructions, which includes both scalar instructions and vector instructions, is decoded by a decoder for controlling execution of the individual instructions. A typical example of such a strategy is a system disclosed in an article by Richard M. Russell, entitled *The CRAY-1 Computer System* contained in communications of the ACM COMMUNICATIONS, January 1978.

A second processing strategy includes separate instruction decoders for decoding the scalar instructions and vector instructions. A typical system utilizing this strategy is discussed, for example, in an article entitled *Hitachi Supercomputer S-810 Array Processor System*, by T. Odaka et al., contained in Supercomputers, published by Elevier Science Publishers BV (North-Holland) 1986. In this system, instructions are decoded by two separate logical units. Utilizing the first processing strategy control over the two species of instructions is inclusive of the control for ensuring proper sequence established between the scalar instructions and the vector instruction may be realized in a facilitated manner, by virtue of the fact that the scalar instructions and vector instructions are intermixed.

Alternately, the second proposed processing strategy permits two types of instructions to be executed independently of each other, thereby facilitating parallel processing, because scalar instruction processing is separate from vector instruction processing. However, the independence of the scalar processing unit and the vector processing unit from each other requires that the vector processing unit be activated by the scalar processing unit. For activation of a vector processing unit, all variety of information required for initiating the vector processing must be established by the scalar processing unit. This establishment processing tends to involve an extended time for preparation before vector computation may be initiated, rendering it difficult or even impossible to make use of the functional performance specific to the vector processing unit for the computation of vectors of short vector length. Additionally, the second processing strategy requires circuitry for informing the scalar processing unit of the fact that a given processing of significance has been completed on the part of the vector processing unit at a given time.

In view of the above, it should be apparent that a need exists for a data processing system which may be utilized to execute an intermixed sequence of scalar and vector instructions in a nonsequential manner with a high degree of efficiency.

SUMMARY OF THE INVENTION

It is therefore one object of the present invention to provide an improved data processing system.

It is another object of the present invention to provide an improved method and system for enhanced processing efficiency within a data processing system.

It is yet another object of the present invention to provide an improved method and system for nonsequential processing of an ordered sequence of scalar and vector instructions within a data processing system.

The foregoing objects are achieved as is now described. The method and system of the present invention may be utilized to enhance processing efficiency in a data processing system which includes multiple scalar instruction processors and a vector instruction processor. An ordered sequence of intermixed scalar and vector instructions is processed in a nonsequential order by coupling those instructions to selected processors. As each instruction is finished an indication of that state is stored within a finish instruction array. The first vector instruction within the ordered sequence is initiated within the vector instruction processor only after an indication that each scalar instruction preceding the first vector instruction is finished. A vector advance signal is generated by the vector instruction processor each time processing of a vector instruction is initiated. A subsequent vector instruction is then initiated when the vector processor assets are available only in response to the presence of the vector advance signal and an indication that all scalar instructions which proceed the subsequent vector instruction within the ordered sequence have finished, without encountering an exception. In this manner, chained processing of vector instructions may be accomplished by initiating processing of a subsequent vector instruction only after possible interruption by a scalar instruction exception is no longer possible.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
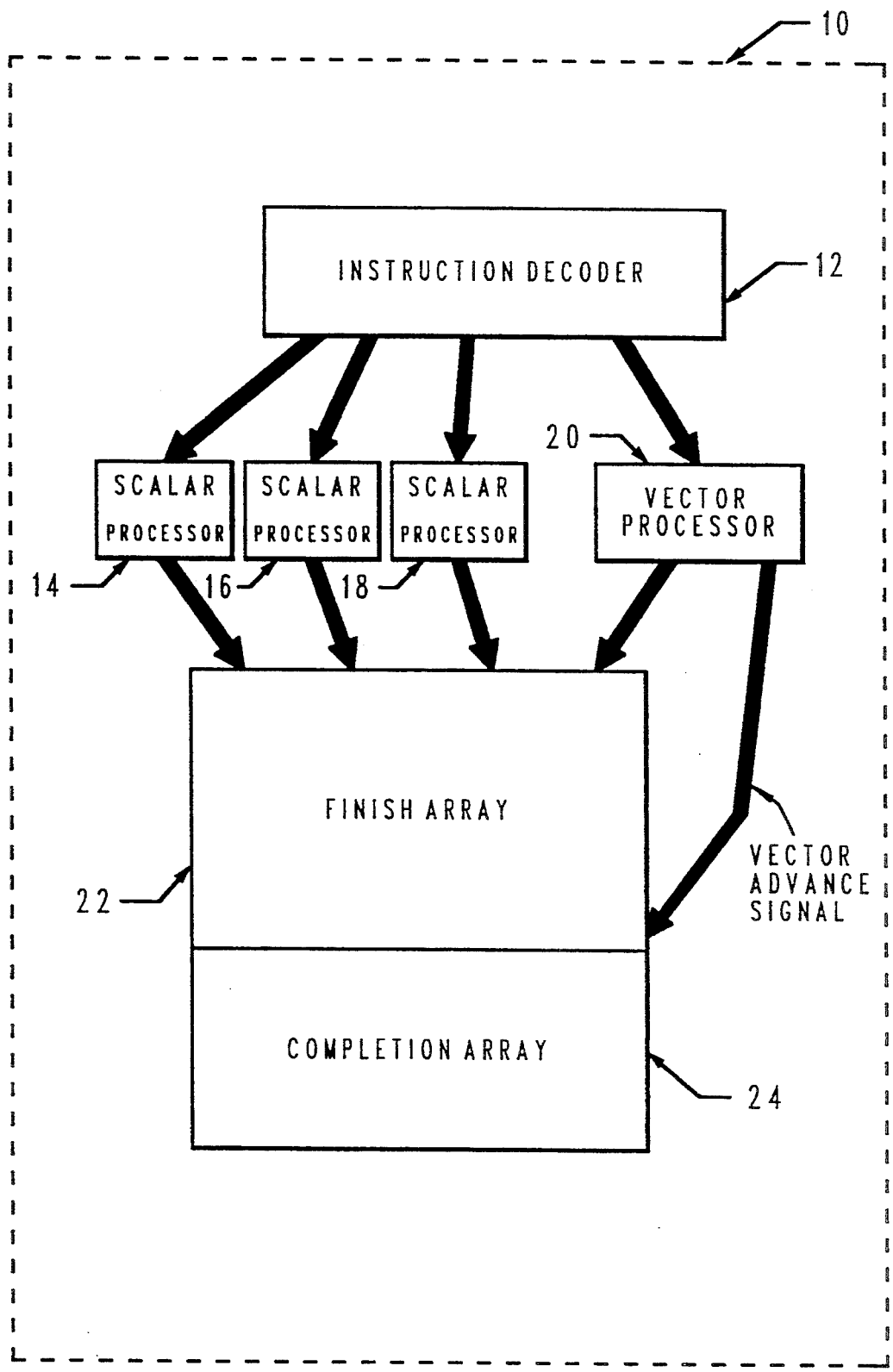
FIG. 1 is a high level block diagram of a multiprocessor data processing system which may be utilized to implement the method and system of the present invention.

With reference now to the figures and in particular with reference to FIG. 1, there is depicted a high level block diagram of a multiprocessor data processing system 10 which may be utilized to implement the method and system of the present invention. Multiprocessor data processing system 10 may be implemented utilizing any well known state-of-the-art multiprocessor data processing systems, such as the International Business Machines Corporation System/390. Of course, those skilled in the art will appreciate that the high level block diagram depicted within FIG. 1 illustrates only those components of a typical multiprocessor data processing system which are utilized to implement the method and system of the present invention and that such multiprocessor data processing systems typically include a greater number of components and functions not illustrated within FIG. 1.

Illustrated within multiprocessor data processing system 10 is instruction decoder 12. Instruction decoder 12 is utilized, in accordance with the depicted embodiment of the present invention, to couple an ordered sequence of intermixed scalar and vector instructions to multiple processing units. In the illustrated embodiment of the present invention, instruction decoder 12 is coupled to three scalar processors 14, 16, and 18. Of course, those skilled in the art will appreciate that a greater or lesser number of scalar processors may be utilized, as a matter of design choice. Similarly, instruction decoder 12 is also coupled to vector processor 20. In view of the fact that the method and system of the present invention are directed to the processing of intermixed scalar and vector instructions, multiprocessor data processing system 10 will require at least one vector processor, such as vector processor 20.

As described above, processing strategies in multiprocessor data processing systems, such as multiprocessor data processing system 10, may be implemented by providing multiple scalar processors and vector processors and thereafter processing the intermixed scalar and vector instructions in a nonsequential order. However, in view of the fact that the results of this processing must subsequently be assembled in an application dictated order, systems of this type typically include an intermediate storage location for storing the results of instruction processing. For example, finish array 22 is provided and is utilized, in a manner well known in the art, to store the results of instruction processing for a period of time prior to utilization of those results in a completion sequence, which will be assembled in an application dictated order. Thus, completion array 24 is also provided.

When utilizing a multiprocessor data processing system, such as multiprocessor data processing system 10, scalar instructions are coupled to a scalar processor in an opportunistic fashion and vector instructions are coupled to vector processor 21:). As each instruction is concluded, the results and an indication that the instruction processing has finished are stored within finish array 22. A completion counter is then utilized to track the finish state of these instructions and, as a specified sequence of instructions are finished, those instructions are assembled in the application specified order within completion array 24. This technique permits greater efficiency in instruction processing by allowing the ordered sequence of instructions to be processed in a nonsequential order.

Figure 2:
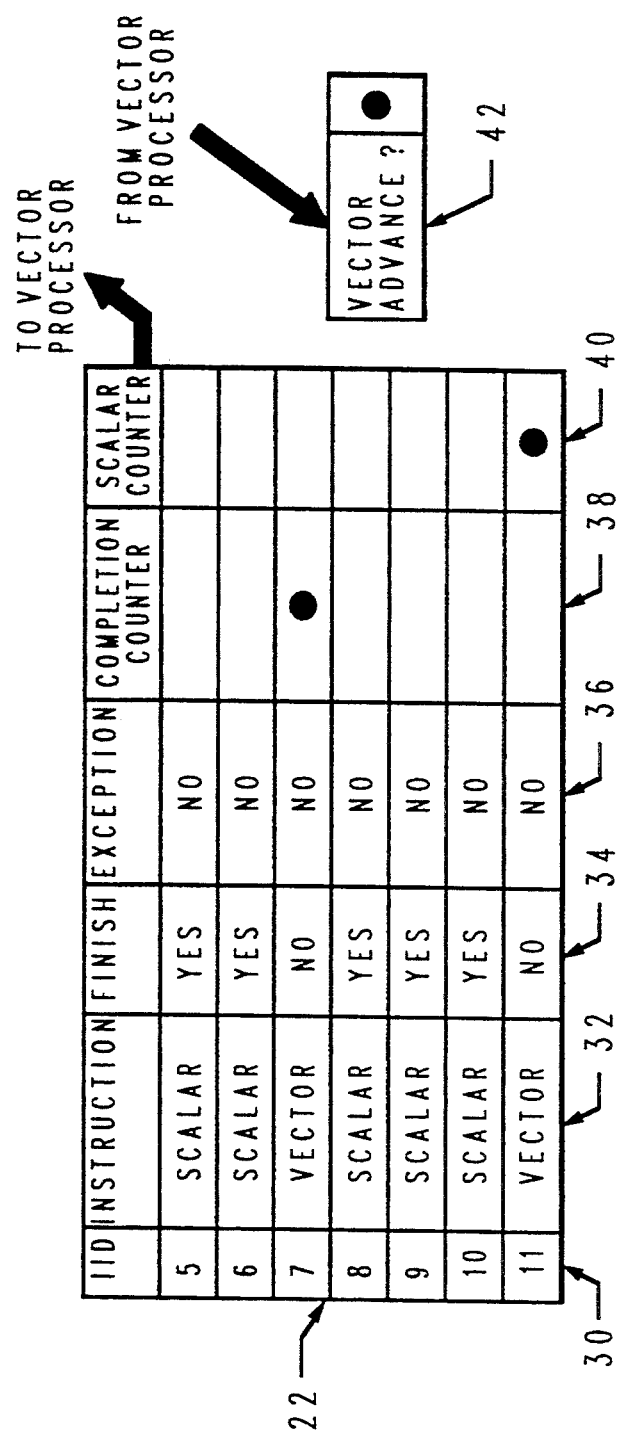
FIG. 2 is a schematic representation of a finish array within the data processing system of FIG. 1, depicting the asynchronous operation of a completion counter and a scalar counter in accordance with the method and system of the present invention.

Referring now to FIG. 2, there is depicted a schematic representation of finish array 22 within multiprocessor data processing system 10 of FIG. 1, depicting the asynchronous operation of a completion counter and a scalar counter, in accordance with the method and system of the present invention. As illustrated, finish array 22 includes several columns of information which are illustrated in schematic form. Column 30 is the instruction identification column (IID) and is utilized to store a unique numeric identification for each instruction within the ordered sequence of intermixed scalar and vector instructions. Next, instruction column 32 stores an indication of whether the instruction associated with each unique instruction identification (IID) is a scalar or vector instruction.

Still referring to finish array 22, column 34 is utilized to provide an indication of whether or not a particular instruction has finished processing within an associated instruction processor within multiprocessor data processing system 10. As depicted within FIG. 2, instructions 5, 6, 8, 9 and 10 have all finished processing; however, instruction 7 has not concluded processing. Of course, those skilled in the art will appreciate that vector instructions typically require a much larger amount of time to process than scalar instructions.

Next, exception column 36 is utilized to provide an indication of whether or not an exception occurred during processing of a particular instruction. Those skilled in the art will appreciate that numerous exceptions may occur which will render the results of a particular instruction processing invalid and prohibit the utilization of those results in the processing of a subsequent instruction. In addition to typical exception conditions, non-architected exceptions, and other events may occur which will render the results of a particular instruction processing unusable for future processing. For example, in the International Business Machines System/390 computer, a Program Event Recording (PER) or Logical Address Compare (LAC) may occur, necessitating the invalidation of the processing results for utilization by subsequent instructions.

Still referring to finish array 22, a completion counter column 38 is depicted. Completion counters are typically utilized in the prior art, in systems such as the system illustrated herein, wherein a sequence of intermixed scalar and vector instructions are processed in a nonsequential order and thereafter stored within a finish array prior to coupling those results to a completion array for utilization in an application specified order. Thus, the indicator within completion counter column 38 is utilized to indicate the particular instruction which represents the current completion state of the ordered sequence of instructions. In this manner, as depicted within FIG. 2, completion counter column 38 includes an indication at instruction 7, indicating that all instructions which precede instruction 7 have been finished and are completed in the application specified sequence.

Next, in accordance with an important feature of the present invention, an independent scalar counter is provided. Scalar counter column 40 is provided and is utilized to indicate the finish status of scalar instructions which follow an unfinished vector instruction. In this manner, scalar instructions, which typically require much less processing time, may be finished prior to the finishing of a preceding vector instruction, such as vector instruction 7. The graphic indicator within scalar counter column 40 is then utilized to identify the location within the ordered sequence of intermixed scalar and vector instructions which represents the last finished instruction following a vector instruction which has not yet finished. This information, as depicted within FIG. 2, is also coupled to vector processor 20 and is replicated therein.

In accordance with an important feature of the present invention, a vector advance signal is provided from vector processor 20 to finish array 22 and the state of that signal is noted schematically at reference numeral 42. The vector advance signal is generated each time a vector instruction is initiated within vector processor 20. Thus, in accordance with the method and system of the present invention, if a vector advance signal is present, as depicted at reference numeral 42 within finish array 22, and all scalar instructions which precede a subsequent vector instruction have been finished, the initiation of a subsequent vector instruction within vector processor 20 is permitted, assuming that the necessary vector processor assets are available. As those skilled in the art will appreciate, vector processors are typically pipelined and the process by which multiple vector instructions may be accomplished simultaneously is known as "chaining."

Still referring to FIG. 2, it may now be seen that after initiating vector instruction 7 and generating a vector advance signal from vector processor 20 to finish array 22, as noted at reference numeral 42, a subsequent vector instruction, vector instruction 11, may be initiated, upon receiving an indication that scalar instructions 8, 9, and 10 have finished. Thus, by providing a scalar counter which is permitted to advance asynchronously with respect to the completion counter, the chaining of subsequent vector instructions within vector processor 20 may be efficiently accomplished.

Figure 3:
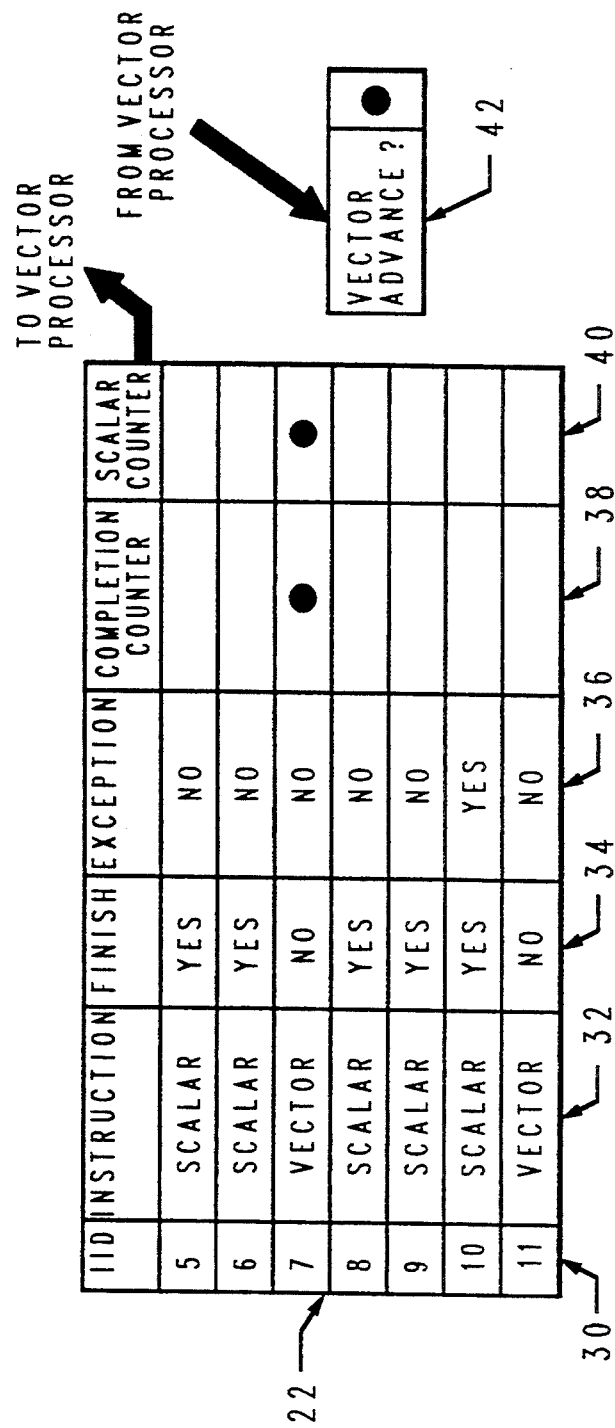
FIG. 3 is a schematic representation of the finish array of FIG. 2 depicting synchronous operation of a completion counter and a scalar counter in response to the occurrence of an exception during processing, in accordance with the method and system of the present invention.

With reference now to FIG. 3, there is depicted the synchronous operation of a completion counter and a scalar counter in response to the occurrence of an exception during processing, in accordance with the method and system of the present invention. Finish array 22 depicted within FIG. 3 is substantially identical to finish array 22 depicted within FIG. 2; however, as noted within exception column 36, an exception has occurred during the processing of scalar instruction 10. In response to the occurrence of this exception, the indication within scalar counter column 40 has been reset to the same location as completion counter column 38. Thus, the initiation of vector instruction 11 will not be permitted in view of the possible interruption of that processing as a result of the exception which occurred during the processing of scalar instruction 10.

In this manner, as described above, despite the availability of vector processor assets and a vector advance signal, the initiation of vector instruction 11 will not be permitted, in view of the indication from the scalar counter that all of the scalar instructions which precede vector instruction 11 have not finished without an exception. Accordingly, those skilled in the art will appreciate that by providing a completion counter and scalar counter, which operate asynchronously, in the manner depicted within FIGS. 2 and 3, the chaining of subsequent vector instructions may be efficiently accomplished by determining the status of preceding scalar instructions for each subsequent vector instruction. This technique assumes data dependency for a subsequent vector instruction with respect to the completion of previous scalar instructions and thus will not permit the initiation of a subsequent vector instruction when the possibility of an interruption exists, as a result of a possible failure of a preceding scalar instruction.

Figure 4:
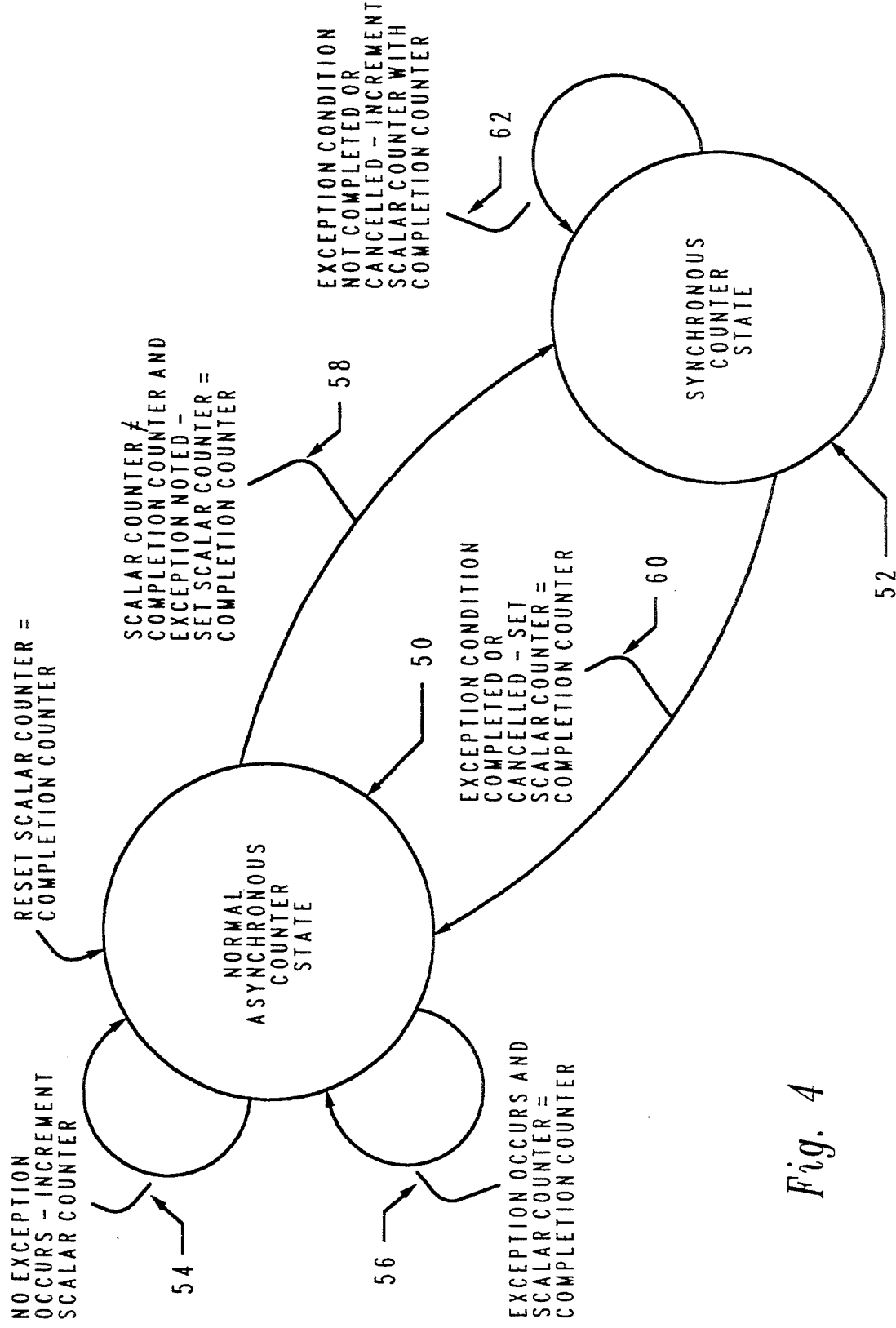
FIG. 4 is a state machine diagram illustrating the asynchronous states of operation of a completion counter and a scalar counter in accordance with the method and system of the present invention.

Finally, referring to FIG. 4, there is depicted a state machine diagram illustrating the asynchronous and synchronous modes of operation of a completion counter and scalar counter, in accordance with the method and system of the present invention. As illustrated, the normal asynchronous counter state is depicted at reference numeral 50. This state is achieved upon a reset and begins initially with the scalar counter equal to the completion counter. Thereafter, if a scalar instruction is reported as finished and no exception has occurred, the scalar counter is incremented, as indicated at reference numeral 54, and the system remains within the normal asynchronous counter state. Additionally, if a scalar instruction is reported as finished and an exception has occurred as indicated at reference numeral 56, the counter will remain within the normal asynchronous counter state if the scalar counter is currently equal to the completion counter at the time of the exception. Finally, if the scalar counter has advanced beyond the completion counter and an exception is noted, the scalar counter is reset to equal the completion counter, as depicted at reference numeral 58, and the state changes to the synchronous state depicted at reference numeral 52. While operating within the synchronous counter state depicted at reference numeral 52, the positions of the scalar counter and completion counter are equal.

During this synchronous operation, if the exception condition is not completed or not cancelled, the scalar counter may only be incremented in conjunction with increments to the completion counter, as depicted at reference numeral 62. However, in the event the exception condition is completed or cancelled, the scalar counter is set equal to the completion counter, as depicted at reference numeral 60 and the process then returns to the normal asynchronous counter state, as depicted at block 50.

Upon reference to the foregoing those skilled in the art will appreciate that by providing a separate scalar counter and completion counter the finish status of preceding scalar instructions may be asynchronously determined and vector instructions may be efficiently chained for enhanced efficiency of processing, without the possibility of an interruption which may otherwise occur as a result of an exception during scalar counter processing, when utilizing the method and system of the present invention.

While the invention has been particularly shown and described with reference to a preferred embodiment, it will be understood by those skilled in the art that various changes in form and detail may be made therein without departing from the spirit and scope of the invention.

We claim:

1. A method for enhanced processing efficiency in a data processing system which includes multiple scalar processors and at least one vector processor and which processes an ordered sequence of intermixed scalar and vector instructions in a nonsequential order, said method comprising the steps of:
   coupling said ordered sequence of intermixed scalar and vector instructions to said multiple scalar processors and said at least one vector processor for processing therein;
   storing an indication of each instruction which is finished processing and an indication of each occurrence of an exception during processing of an instruction within a finish instruction array;
   initiating a first vector instruction within said at least one vector processor only in response to an indication within said finish instruction array that each scalar instruction which precedes said first vector instruction within said ordered sequence is finished processing;
   generating a vector advance signal in response to an initiation of each vector instruction within said at least one vector processor; and
   initiating a subsequent vector instruction within said at least one vector processor only in response to an occurrence of said vector advance signal and an indication within said finish instruction array that each scalar instruction which precedes said subsequent vector instruction within said ordered sequence of intermixed scalar and vector instructions is finished processing and no exception has occurred during processing of any scalar instruction which precedes said subsequent vector instruction within said ordered sequence of intermixed scalar and vector instructions wherein chained processing of vector instructions is accomplished.

2. The method for enhanced processing efficiency in a data processing system according to claim 1, wherein each instruction within said ordered sequence of intermixed scalar and vector instructions includes an associated unique identification and wherein said step of storing an indication of each instruction which is finished processing within a finish instruction array further includes the step of storing said unique identification associated with each instruction which is finished processing within said finished instruction array.

3. The method for enhanced processing efficiency in a data processing system according to claim 2, further including the step of storing within said finish instruction array an indication of which of said ordered sequence of intermixed scalar and vector instructions comprise scalar instructions.

4. A data processing system for efficiently processing an ordered sequence of intermixed scalar and vector instructions in a nonsequential order utilizing multiple scalar processors and at least one vector processor, said data processing system comprising:
   means for coupling said ordered sequence of intermixed scalar and vector instructions to said multiple scalar processors and said at least one vector processor for processing therein;
   a finish instruction array coupled to said multiple scalar processors and said at least one vector processor;
   means for storing an indication of each instruction which is finished processing and an indication of each occurrence of an exception during processing of an instruction within said finished instruction array;
   means for initiating a first vector instruction within said at least one vector processor only in response to an indication within said finish instruction array that each scalar instruction which precedes said first vector instruction within said ordered sequence is finished processing;
   means for generating a vector advance signal in response to an initiation of each vector instruction within said at least one vector processor; and
   means for initiating a subsequent vector instruction within said at least one vector processor only in response to an occurrence of said vector advance signal and an indication within said finish instruction array that each scalar instruction which precedes said subsequent vector instruction within said ordered sequence of intermixed scalar and vector instructions is finished processing and no exception has occurred during processing of any scalar instruction which proceeds said subsequent vector instruction within said ordered sequence of intermixed scalar and vector instructions wherein chained processing of vector instructions is accomplished.

5. The data processing system for efficiently processing an ordered sequence of intermixed scalar and vector instructions according to claim 4, wherein each instruction within said ordered sequence of intermixed scalar and vector instructions includes an associated unique identification and wherein said means for storing an indication of each instruction which is finished processing within a finish instruction array comprises means for storing said unique identification associated with each instruction which is finished processing within said finished instruction array.

6. The data processing system for efficiently processing an ordered sequence of intermixed scalar and vector instructions according to claim 4, further including means for storing within said finish instruction array an indication of which of said ordered sequence of intermixed scalar and vector instructions comprise scalar instructions.

* * * * *